United States Patent

[11] 3,540,387

| [72] | Inventors | James McLaren and |
|---|---|---|
| | | Derek F. Williams, Cheltenham, England |
| [21] | Appl. No. | 764,648 |
| [22] | Filed | Oct. 2, 1968 |
| [45] | Patented | Nov. 17, 1970 |
| [73] | Assignee | Coal Industry (Patents) Limited |
| | | London, England |
| | | a company of Great Britain |
| [32] | Priority | Oct. 10, 1967, July 7, 1968 |
| [33] | | Great Britain |
| [31] | | 46,234/67 and 27,239/68 |

[54] PROCESS AND APPARATUS FOR THE COMBUSTION OF CARBONACEOUS MATERIAL
3 Claims, No Drawings

[52] U.S. Cl. .................................................... 110/1
[51] Int. Cl. .................................................... F23b 7/00
[50] Field of Search ....................................... 110/11, 1J, 28J

[56] References Cited
UNITED STATES PATENTS
3,320,906  5/1967  Domahidy ..................... 110/1
FOREIGN PATENTS
768,656  2/1957  Great Britain ................ 110/1

*Primary Examiner*—Kenneth W. Sprague
*Attorney*—Stevens, Davis, Miller & Mosher ABSTRACT: A process for the combustion of carbonaceous material such as coal to reduce the sulphur content of the off-gases involves burning the material in a fluidised bed. The fluidised bed comprises ash having less than 0.5 percent carbon and is held at a temperature of between 700 and 900°C. Carbonate such as calcium carbonate is added in proportion of 2—14 percent by weight to the material so that the sulphur is retained in the bed.

PROCESS AND APPARATUS FOR THE COMBUSTION OF CARBONACEOUS MATERIAL

This invention relates to a process and apparatus for the combustion of carbonaceous material within a fluidised bed.

In the combustion of carbonaceous material containing sulphur, the gases of combustion normally carry away a major proportion of this sulphur thereby resulting in pollution of the atmosphere.

An object of the invention is to reduce the amount of sulphur discharged with the combustion gases during combustion of the carbonaceous material.

For this purpose the invention provides a process for the combustion of carbonaceous material wherein the material is fed into a fluidised bed of ash containing not more than 0.5 percent by weight of carbon, carbonate such as calcium carbonate is also fed to the fluidised bed and the carbonaceous material is burned within said bed at a temperature in the range 700—900°C. Advantageously the feed of carbonate as a proportion of the carbonaceous material fed to the fluidised bed is between 2—14 percent by weight.

By the addition of carbonate to the fluidised bed sulphur is more readily retained in the ash and fines, and is not therefore carried out in the exhaust gases.

A proportion of the hot ash is continuously discharged from the fluidised bed according to the rate of feed of the incoming carbonaceous material and heat transfer is effected between the fluidised bed and heat exchange medium circulating through the bed.

Conveniently a bed of ash is contained in a reactor which is fluidised by a stream of upwardly flowing gas entering through openings in the base of the reactor.

Ash may be continuously removed from a discharge aperture located towards a lower part of the reactor and carbonaceous material may be fed by pneumatic means into the fluidised bed through an inlet aperture at a relatively upper level in the reactor.

Heat exchange medium may be circulated through tubes located within the fluidised bed. The hot medium in liquid or gaseous form may then be led to a boiler or the like for electric power generation.

The carbonaceous material containing sulphur may be coal ground to a suitable fine size e.g., 0—10 B.S.S.

In addition to or as an alternative to calcium carbonate or limestone, other carbonate containing substance, for example dolomite, may be added to the fluidised bed. Ferrous oxide may also be added to the bed.

In an example of the invention various coals were burnt in a fluidised bed of ash 0.6 m. deep at 800°C., the velocity of the fluidising gas being 0.6 m/sec., and fines carried over by the exhaust gases being recycled to the bed. Limestone of size less than 10 B.S.S. was added to the fluidised bed.

Coal from Goldthorpe Colliery, England containing 2.1 percent sulphur and 0.3 percent $CO_2$ and coal from Ohio, U.S.A. containing 2.25 percent sulphur and 1.23 percent $CO_2$ were burnt.

The results were as follows:

| Coal | Limestone added, percent by weight of coal feed | Carbonate in coal feed as percent $CO_2$ w./w. | Sulphur retention in ash, percent | Efficiency of sulphur retention, percent of original sulphur in coal $\bar{X}$ |
|---|---|---|---|---|
| Goldthorpe | 0 | 0.5 | 8 | 44 |
|  | 4.0 | 2.2 | 53 | 68 |
|  | 6.1 | 3.2 | 72 | 58 |
|  | 6.1 | 3.2 | 64 | 52 |
|  | 8.0 | 4.0 | 83 | 53 |
|  | 12.0 | 5.7 | 98 | 40 |
| Ohio | 0 | 1.3 | 28 | 73 |
|  | *0 | 1.3 | 25 | 64 |
|  | 4.2 | 3.1 | 50 | 48 |
|  | 11.6 | 6.2 | 81 | 36 |

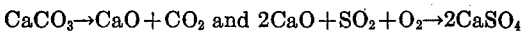

$\bar{X}$ This column gives the ratio of the weight of sulphur retained 100/weight of sulphur which would have been retained stoichiometrically according to the total $CO_2$ fed in the bed in the coal and added carbonate containing substance.

In the test marked * the ash bed has formed of merlite. In the remaining tests of Ohio coal the ash bed was formed of ash from coal from Babbington Colliery, England. In the tests with Goldthorpe coal the ash was derived from Goldthorpe coal. In each test the carbon content of the ash was less than 0.5 percent by weight.

The results show, for example, that the addition of 12 percent limestone to Goldthorpe coal in the fluidised bed resulted in the emission of only 2 percent of the original sulphur content of the coal in the exhaust gases. In this test the exhaust gases contained only 35 p.p.m. of $SO_2$ and $SO_3$. About 90 percent of the retained sulphur was retained in the ash and 10 percent in the secondary fines and dust in the exhaust gas leaving a secondary cyclone separator.

The carbonate inherent in the Ohio coal led to the retention of a quarter of its sulphur content in the ash without the addition of limestone or other carbonate. On the addition of limestone so that about twice the stoichiometric quantity i.e., according to the equations $$CaCO_3 \rightarrow CaO + CO_2 \text{ and } 2CaO + SO_2 + O_2 \rightarrow 2CaSO_4$$

was present, only 19 percent of the sulphur was present in the exhaust gas.

The amount of carbonate added is preferably greater than the stoichiometric amount in order to retain the sulphur The sulphur content of the exhaust gas remains constant over a continuous extended period of combustion even though the quantity of carbonate may buildup in the system.

We claim:

1. A process for the combustion of a carbonaceous material containing sulphur comprising the steps of feeding the material to a fluidised bed of ash containing no more than 0.5 percent by weight of carbon, burning the carbonaceous material within said bed at a temperature in the range 700°C.—°C., while feeding a carbonate such as calcium carbonate to the bed in the proportion of 2—14 percent by weight of the weight of said material, whereby sulphur from said material reacts with said carbonate and is retained by the ash.

2. A process according to claim 1 wherein the carbonate is finely divided limestone.

3. A process according to claim 2 wherein the amount of added limestone is about twice the stoichiometric equivalent of the sulphur content of the material.